United States Patent
Le et al.

(10) Patent No.: US 12,112,108 B2
(45) Date of Patent: Oct. 8, 2024

(54) METHOD TO COMPUTE TIMING YIELD AND YIELD BOTTLENECK USING CORRELATED SAMPLE GENERATION AND EFFICIENT STATISTICAL SIMULATION

(71) Applicant: Synopsys, Inc., Mountain View, CA (US)

(72) Inventors: Jiayong Le, Sunnyvale, CA (US); Wenwen Chai, Sunnyvale, CA (US); Li Ding, Sunnyvale, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 17/433,595

(22) PCT Filed: Feb. 26, 2020

(86) PCT No.: PCT/US2020/019994
§ 371 (c)(1),
(2) Date: Aug. 24, 2021

(87) PCT Pub. No.: WO2020/176684
PCT Pub. Date: Sep. 3, 2020

(65) Prior Publication Data
US 2022/0129611 A1   Apr. 28, 2022

Related U.S. Application Data

(60) Provisional application No. 62/810,504, filed on Feb. 26, 2019.

(51) Int. Cl.
*G06F 30/3312* (2020.01)
*G06F 30/337* (2020.01)
(Continued)

(52) U.S. Cl.
CPC ........ *G06F 30/3312* (2020.01); *G06F 30/337* (2020.01); *G06F 2111/08* (2020.01); *G06F 2119/22* (2020.01)

(58) Field of Classification Search
USPC ......................................................... 716/113
See application file for complete search history.

(56) References Cited

U.S. PATENT DOCUMENTS

| 5,365,463 A | 11/1994 | Donath et al. |
| 8,239,798 B1 | 8/2012 | Goyal et al. |

(Continued)

FOREIGN PATENT DOCUMENTS

WO   2020176684   9/2020

OTHER PUBLICATIONS

Li, et al., "Defining Statistical Timing Sensitivity for Logic Circuits with Large-Scale Process and Environmental Variations", IEEE Transactions on Computer-Aided Design of Integrated Circuits and Systems, vol. 27, No. 6, Jun. 2008, pp. 1041-1054.

(Continued)

*Primary Examiner* — Bryce M Aisaka
(74) *Attorney, Agent, or Firm* — Jaquez Land Greenhau; Bruce W. Greenhaus

(57) ABSTRACT

Various embodiments of a method and apparatus for determining parametric timing yield and bottlenecks are disclosed which take into account correlation between electrical circuit paths through common timing arcs of an integrated circuit chip under design. Monte Carlo samples of timing arc delays are generated and used in computing timing yield and identify yield bottlenecks.

10 Claims, 10 Drawing Sheets

(51) Int. Cl.
*G06F 111/08* (2020.01)
*G06F 119/22* (2020.01)

(56) References Cited

U.S. PATENT DOCUMENTS

2009/0138838 A1* 5/2009 Nitta .................. G06F 30/3312
716/113
2009/0271751 A1* 10/2009 Fatemi ........... G01R 31/318371
716/113

OTHER PUBLICATIONS

Keogh-Lehmann, Sabine, Invitation to Pay Additional Fees and, Where Applicable, Protest Fee received from the EPO dated Jun. 25, 2020, Appln. No. PCT/US2020/019994, 25 pgs.
Keogh-Lehmann, Sabine, International Search Report and Written Opinion received from the EPO dated Aug. 18, 2020, Appln. No. PCT/US2020/019994, 28 pgs.
Lee, Sun Hwa, International Preliminary Report on Patentability received from WIPO dated Aug. 25, 2021, Appln. No. PCT/US2020/019994, 20 pgs.

* cited by examiner

METHOD TO COMPUTE TIMING YIELD AND YIELD BOTTLENECK USING CORRELATED SAMPLE GENERATION AND EFFICIENT STATISTICAL SIMULATION

COPYRIGHT NOTICE

The assignee of this patent document has no objection to the facsimile reproduction by anyone of the patent document itself or of the patent application, as it appears in the files of the United States Patent and Trademark Office, but otherwise reserves all rights whatsoever in any included works of authorship protected by copyright.

BACKGROUND

(1) Technical Field

This disclosure relates to the field of electronic design automation in general. More specifically, the present invention relates to statistical timing analysis, including the following topics: computation of timing yield and yield bottleneck using correlated sample generation and efficient statistical simulation in particular.

(2) Background

With the rapid development of mobile devices, the "internet of things" (IOT) and artificial intelligent devices, there has been an increase in the demand for circuit designs that can perform complex functions, while consuming less power, and so use power more efficiently. This demand for lower power consumption has led to a reduction in the operating voltage of the integrated circuit (IC) chips used in many of the products being built today. In turn, this reduction in the operating voltage has resulted a significant increase in the negative effects of process environment variations in the manufacture very large scale integrated (VLSI) circuit chips. More particularly, variations in the process used to manufacture IC chips results in challenges related to parametric timing yield. Parametric timing yield is the ratio of IC chips that meet timing requirements vs. those that fail to meet the timing requirements. Today's corner-based timing sign-off methodology faces increasing challenges in predicting timing yield of an IC design. Although variation methodology, such as parametric yield, has been widely adopted in leading static timing analysis software, there are still no good methods available to accurately compute the timing yield using variation information. The main challenge in accurate yield computation is to capture topological correlations between different timing paths of the design. Brute-force full-chip Monte Carlo (MC) analysis in which randomized values are used to assist in predicting statistical outcomes is not feasible due to the extreme run time impact (i.e., the relatively large amounts of time required to run such models).

Accordingly, it would be advantageous to provide a system that can more accurately predict the impact of particular characteristics (e.g., process and environmental variations) on the likelihood that a VLSI chip will meet timing requirements and thus predict parametric timing yield for particular assumptions regarding process and environmental variations which require the modeling of millions of local random variables.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1A:
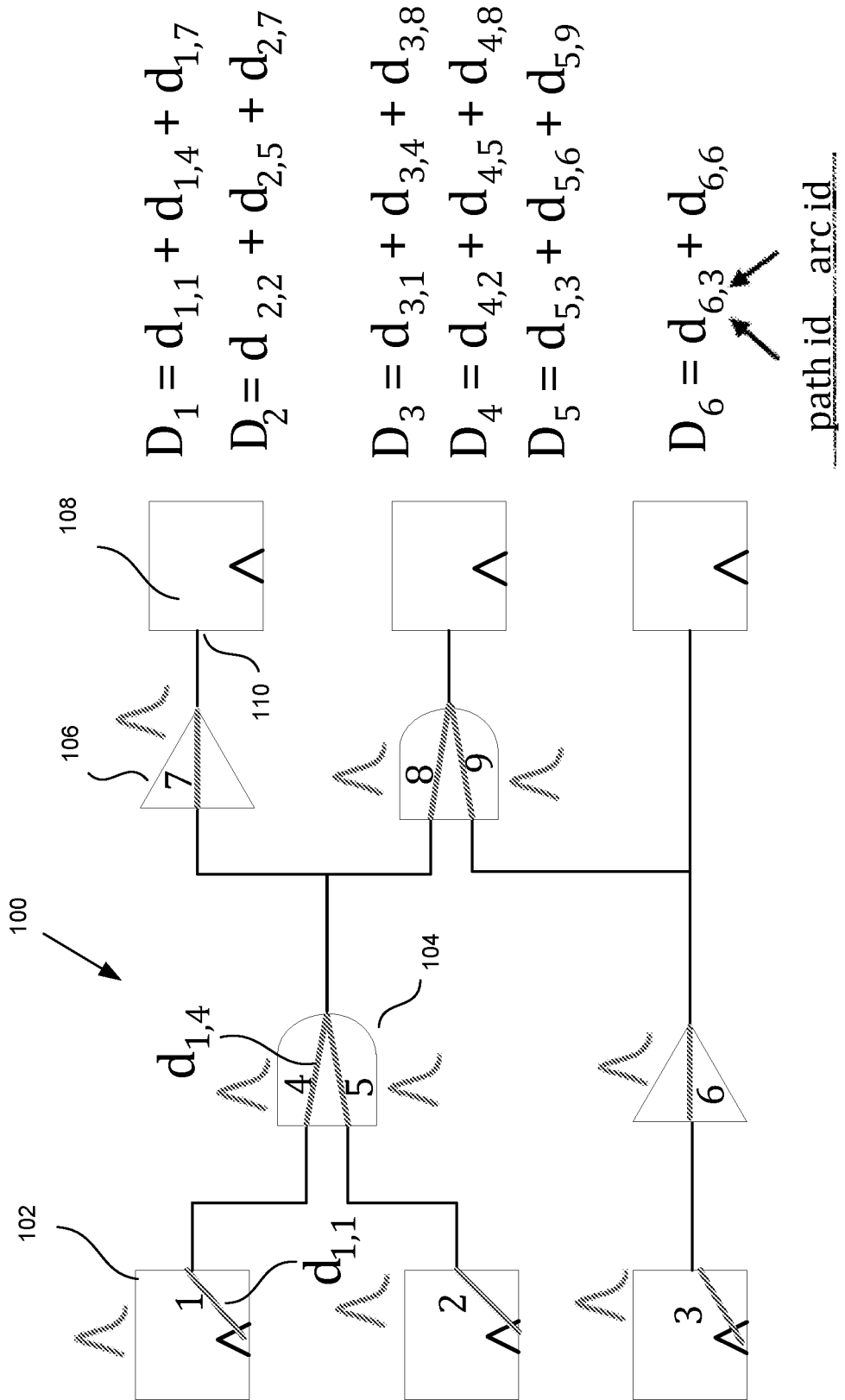
FIG. 1A is a simplified diagram of a portion or "block" of a circuit design of an integrated circuit (IC).

FIG. 1A is a simplified diagram of a portion or "block" 100 of a circuit design of an integrated circuit (IC). In some cases in which analysis of circuit delays is done by "path-based" analysis, IC designs are modeled as comprising a plurality of paths, each of which runs through a plurality of elements. For example, in FIG. 1A, there are six unique paths through the block 100 of the circuit design. The first path is designated as $D_1$. The path $D_1$ traverses three elements of the block 100. The first element is a register 102 having a clock input and an output, the second element is a two input AND-gate 104 and the third element is an inverter 106. Each path through an element is associated with a unique timing arc numbered 1 through 9 in the block 100. For example, there are two paths through the input AND-gate 104; a first path from the first input to the output and a second path from the second input to the output. Each of these two paths has a unique timing arc 4, 5. The path $D_1$ arrives at a register 108 with a delay that is the result of the "timing arcs" 1, 4, 7 associated with each element 102, 104, 106. The first timing arc encountered by the signal traversing the path $D_1$ is timing arc 1, and the delay through timing arc 1 for the path $D_1$ is designated $d_{1,1}$. The first numeric index refers to the path id "1" of path $D_1$, and the second numeric index refers to the timing arc id "1" of the element 102. The second timing arc encountered is timing arc 4 of the second element 104, which has a delay designated as $d_{1,4}$. Finally, a third timing arc encountered on path $D_1$ is timing arc 7 with a delay $d_{1,7}$ that is the result of the third element 106. Note that the numeric index "7" refers to the timing arc id "7" associated with the inverter 106. It can be seen that in this simple example, there are 6 unique paths and nine unique timing arcs. In addition, there are three unique "endpoints" 110, each at the input to a capture flip-flop 108. It should be noted that it is not necessary that an endpoint be at the input of a capture flip-flop, but rather an endpoint is at the point where the slack for a path is measured (i.e., the point at which no additional delays will be imposed that can impact the slack). Slack is the difference between the required time and the arrival time at the endpoint. A positive slack, s at an endpoint implies that the arrival time at that endpoint may be increased by s, without affecting the overall delay of the circuit. Conversely, negative slack implies that a path is too slow, and the path must be sped up (or the reference signal delayed) if the whole circuit is to work at the desired speed.

In other cases, a graph based model of a circuit is used to assist in the analysis of the circuit delays. In the case of a graph based analysis, a circuit is modeled with a timing graph in which there is a source node and a sink node at the beginning and end of the circuit. A number of other nodes are defined between the sink and source as well as a set of circuit elements, such as gates and wires. The nodes represent pins of the circuit elements. The propagation delay between nodes is modeled. In some cases, nodes may be coupled in a manner such that some routes from the source to the sink go through the same elements. In some cases, the delays are modeled as distinct nodes in the graphical representation of the circuit. In contrast, the path analysis defines a set of paths, each of which have an input and an output and a set of elements with delays through which the path traverses. Several of the elements in one path may be common to elements in one or more other paths. In both cases, the delays from a starting point to an end point are characterized and slack can be determined based on the difference between the sum of the delays and the required minimum time to traverse from start to end.

Figure 1B:
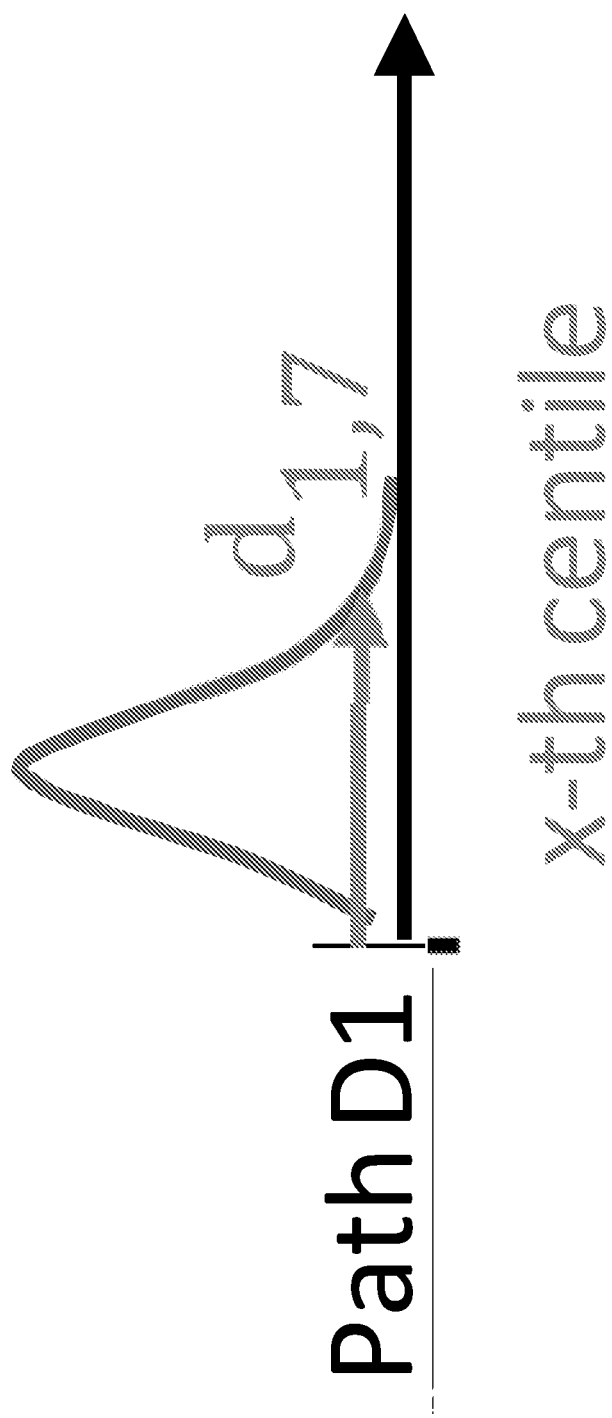
FIG. 1B is a plot of the probability distribution function of the delay $d_{1,7}$ for the timing arc 7.
Figure 1C:
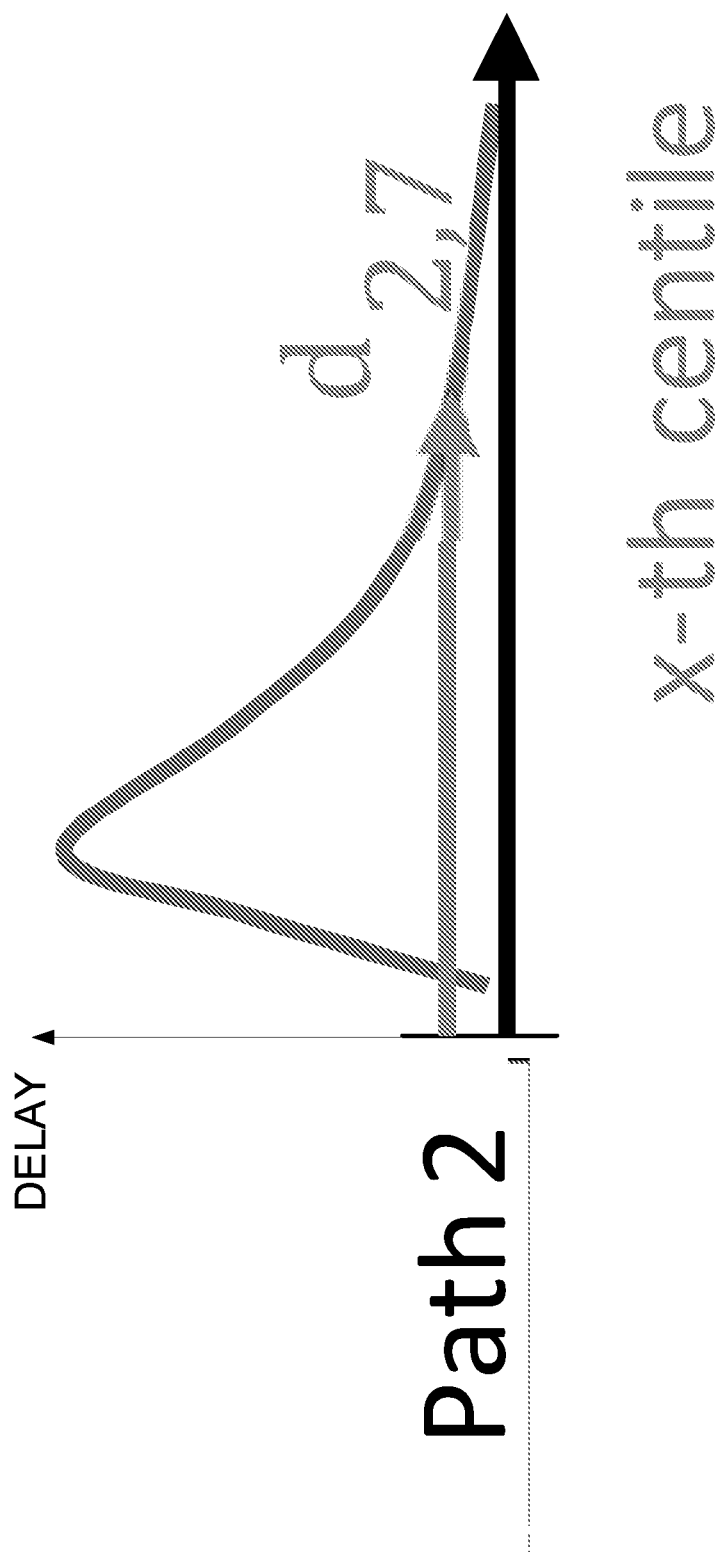
FIG. 1C is a plot of the probability distribution function of the delay $d_{2,7}$ for the timing arc 7.

In some embodiments of the disclosed method and apparatus in which path-based analysis is used, path context (i.e., which path is at issue) and a speed index into a delay distribution determined based on variation-aware timing analysis determines the delay of the timing arc along each path of interest. Once the analysis is done, a set of paths will be extracted, and common timing arcs of the paths will be collected and subsets of timing arcs will be associated with endpoints. A timing arc is considered to be common to two paths if the timing arc is due to the delay through the same circuit element. For example, the delay $d_{1,7}$ of timing arc 7 on path $D_1$ and the delay $d_{2,7}$ of timing arc 7 on path $D_2$ share the common timing arc 7, since they are both the result of the delay through the inverter 106 shown in FIG. 1A. However, it should be understood that shape of the probability distribution function for the delay $d_{1,7}$ of timing arc 7 on path $D_1$ (i.e., the probability distribution function for possible delay values resulting from the inverter 106 for signals traversing the path $D_1$) may be different from the shape of the probability distribution function for the delay $d_{2,7}$ of timing arc 7 on path $D_2$ due to the fact that the signals that traverse path $D_1$ will have traversed different components than the signals that traversed the path $D_2$. FIG. 1B is a plot of the probability distribution function of the delay $d_{1,7}$ for the timing arc 7 for path $D_1$. FIG. 1C is a plot the probability distribution function of the delay $d_{2,7}$ for the timing arc 7 for path $D_2$. As can be seen from these two plots, the shape of the probability distribution function is slightly different for each.

Upon collecting the common timing arcs, random delay samples are generated for each of the timing arcs. This is done by having a Monte Carlo value generator generate a plurality of speed indexes, each associated with one of the timing arcs of an IC design. The speed index is a measure of the slowness of the timing arc (i.e., the relative delay through the circuit element), related to local process and environmental variations. Each value of the speed index generated by the Monte Carlo value generator is associated with a timing arc to generate a delay value within a matrix (i.e., a "delay matrix") for a particular delay sample for the associated timing arc of an IC that is being simulated. Accordingly, each element of the delay matrix represents a delay associated with one timing arc along one path of an IC design at issue. The disclosed analysis can be performed on an individual path through a circuit, for each path of a block within a complex circuit or for an entire complex circuit, such as a circuit of a VLSI IC chip. The use of the speed index allows the effects of local variations in process and environment to be taken into account in determining the delay of each timing arc along each yield-critical path. Using a Monte Carlo technique takes into consideration the statistical distribution of delay values due to process and environmental variations (e.g., based on a probability density function determined by the variation-aware timing analysis) and allows correlations between the delays associated with common timing arcs in different paths to be taken into account.

The disclosed method accurately computes parametric timing yield and identifies yield-critical timing arcs, paths and blocks by performing the Monte Carlo simulations on a set of yield critical paths. For timing arcs that are common to more than one path, the same speed index value is used to generate the delay value placed in the delay matrix for each path in which that common timing arc lies. Having one speed index value for a timing arc that is common to several paths takes into account the correlation between paths that share common timing arcs, such as the shared timing $d_{1,4}$ in path $D_1$ and $d_{3,4}$ in path $D_3$. Accordingly, taking into account the effect of common timing arcs allows correlation between different paths to be captured.

In the example of the block 100 of FIG. 1A, a delay matrix (set of samples from a simulation) might include the following:

$D_1 = d_{1,1} + d_{1,4} + d_{1,7}$ $D_2 = d_{2,2} + d_{2,5} + d_{2,7}$ $D_3 = d_{3,1} + d_{3,4} + d_{3,8}$ $D_4 = d_{4,2} + d_{4,5} + d_{4,8}$ $D_5 = d_{5,3} + d_{5,6} + d_{5,9}$ $D_6 = d_{6,3} + d_{6,6}$

Several such "instances" of the delay matrix are generated during the simulation to create a set of simulated sample ICs, each with the same structure, but with different delay values, wherein the delay values of any particular element of each instance of the delay matrix (i.e., of each simulated sample IC) is determined by the speed index output by the Monte Carlo generator, which is then used to reference the delay value of each timing arc. The criteria used by the Monte Carlo generator to generate each speed index value is based on the probability density function for the delay for the particular timing arc addressed by the speed index as determined by the variation-aware timing analysis performed for the circuit element that is responsible for that particular timing arc.

A similar modeling of a sample cell can be performed using "graph-based" analysis, as opposed to "path-based" analysis. That is, in embodiments of the disclosed method and apparatus in which graph based analysis is used, delays modeled in a graphical representation of the circuit are identified and modeled based on relevant process and environmental variables as determined by the variation-aware timing analysis. In some cases, a first delay within the graphical representation of the circuit may be the result of the first signal traversing a circuit element. A second delay within the graphical representation of the circuit may be the result of a second signal traversing the same common circuit element. However, if the second signal traverses different elements then the first signal before entering the common circuit element, the second delay through the common element may be different from the first delay through the common element. Similarly, connections to different output elements may affect the delay. Nonetheless, the first and second delay will be correlated with respect to the process and environment (i.e., the same process and environmental factor are responsible for variations in both the first and the second delay). Accordingly, a "speed index" can be defined that is associated with a particular process and environmental conditions. Accordingly, one or more delays that are responsive to changes in the particular process and environmental state are associated with a particular speed index.

The random samples (i.e., elements of the delay matrix) are generated and used to evaluate path "arrival/slack" and "design slack". Arrival/slack is the difference between the calculated timing at an endpoint and the required timing for that endpoint. For example, for a particular design, the signal must traverse a particular path with no more than 13 ns of delay. If a signal can traverse the path in 10 ns, then there is a positive arrival/slack of 3 ns. If on the other hand the signal takes 15 ns to traverse the path, the slack is -2 ns. If a particular VLSI chip design has 100 such paths (typically the number is far greater), the minimum arrival/slack will define the "design slack". That is, if any of the 100 paths fail to meet the timing requirement, the design will fail to meet timing requirements as well. Accordingly, the design slack is determined by the worst slack for all of the paths (i.e., worst being the smallest value, with negative numbers being smaller than positive numbers, and negative numbers that have a higher absolute value being smaller than negative numbers with a lower absolute value). Therefore, design slack is the statistical minimum (min) of all slack in each path. Since there will be multiple samples of the IC (i.e., multiple delay matrices), there will be a distribution of slack values over the set of IC samples. Once the Monte Carlo simulation is done (i.e., several timing matrices have been generated, one for each IC sample), design yield is determined from the ratio of slacks that are non-negative with respect to the total number of IC samples, and yield bottleneck is identified for applications that can optimize the design, such as Yield ECO (Engineering Change Order) wherein logic can be inserted directly into a gate level netlist corresponding to changes that are desired to increase the yield.

Figure 2:
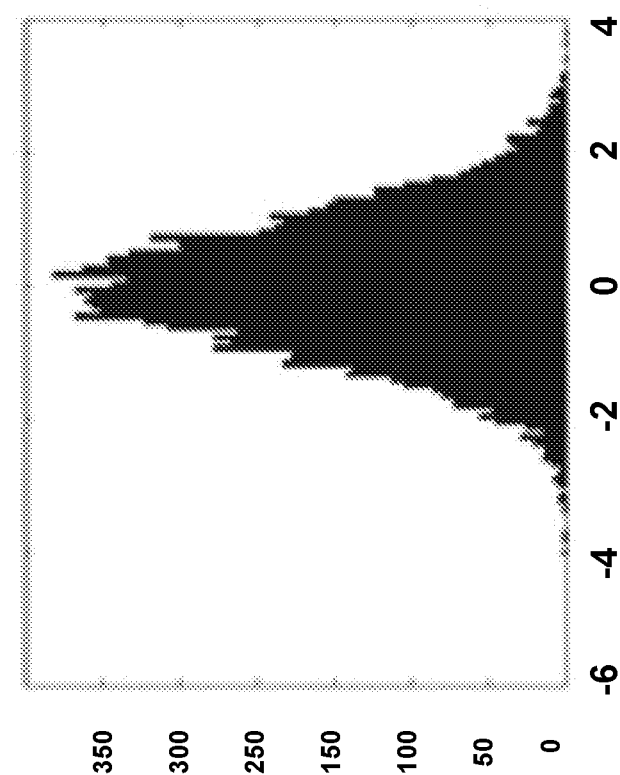
FIG. 2 is a plot of the statistical min of 100 random variables, wherein the random variables are fully correlated.

FIG. 2 is a plot of the statistical min of 100 random variables, wherein the random variables are fully correlated. For example, each random variable may represent the delay through a particular path of a VLSI IC. In such a case, the random variables would be fully correlated if each timing arc of one path were the same as a corresponding timing arc in each other path for all 100 paths. Accordingly, the plot shown in FIG. 2 is centered at zero with a gaussian distribution.

Figure 3:
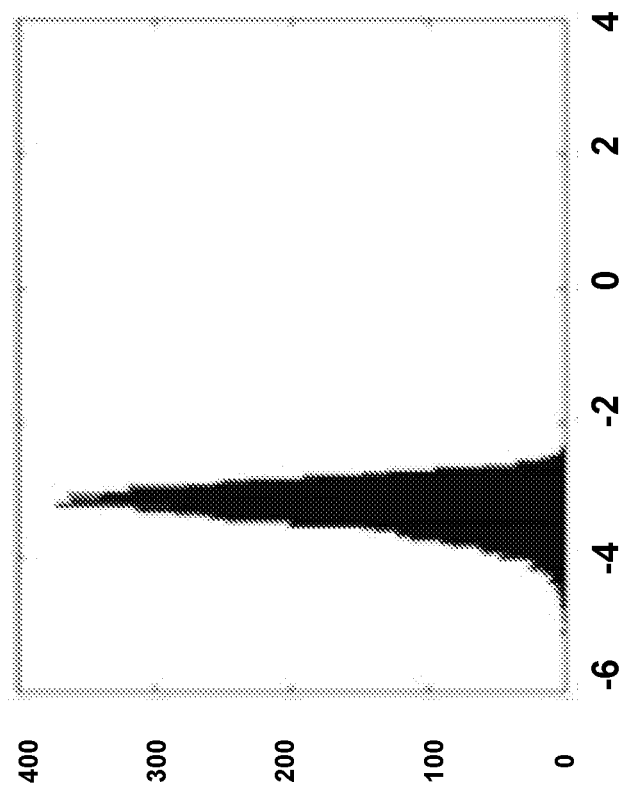
FIG. 3 is a similar plot to that shown in FIG. 2, however the random variables are fully independent.

FIG. 3 is a similar plot. However, the random variables are fully independent. In the example in which these are paths through a VLSI IC, there would be no common timing arcs in the paths. Comparing the two plots, it can be seen that the distribution from the independent set of random variables shown in FIG. 3 is narrower but has a significant mean shift and relatively long tail. Hence, the distribution shown in this plot is worse than the distribution from the correlated set of random variables shown in FIG. 2, which is more centered around zero, with far fewer points in the range of -4 to -2. It can be seen from these two plots that the correlation between the paths has a strong impact on the design slack distribution. Therefore, it is important to take such correlation between paths into consideration in determining a design slack distribution for determining timing yield.

Figure 4:
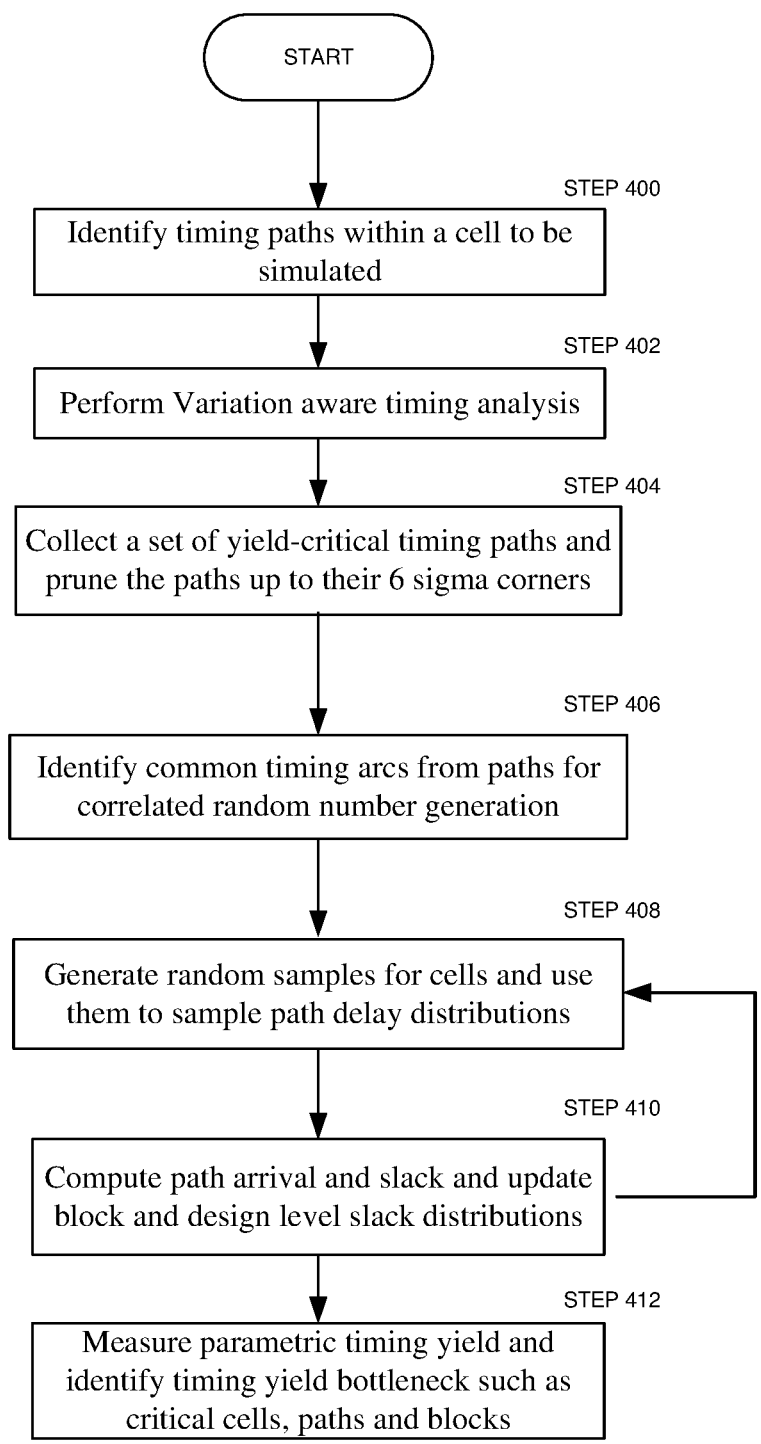
FIG. 4 is a high level flow chart of some embodiments of the method disclosed herein.

FIG. 4 is a high level flow chart of some embodiments of the method disclosed herein. Initially, timing paths are identified within cells of an IC design to be simulated (STEP 400). Variation aware timing analysis is performed (STEP 402) to determine timing arcs along the timing paths throughout the design. Several techniques for performing variation aware timing analysis are well-known in the art. Any known technique may be employed for the purpose of the disclosed method. That is, the present method is not dependent upon any particular technique for performing such analysis. Upon determining the statistical variations in the delays of the timing arcs as a result of the analysis, a set of yield-critical timing paths are identified. Such yield-critical timing paths include those paths that are most likely to be statically significant in determining the yield. That is, such yield-critical timing paths will be likely to be instrumental in determining the design slack, since they are the paths that are likely to have slack that is negative. In some embodiments, that collection of yield-critical timing paths are "pruned" to their 6-sigma corners (STEP 404). That is, the timing arcs output from the variation aware timing analysis are limited to those resulting from variations that are within 6 standard deviations from nominal, such as deviations of greater than 6 standard deviations from the nominal doping concentrations. This pruning provides a closed universe of values for the path timing by eliminating distant outliers.

Upon identifying those yield-critical timing paths and pruning them to their 6-sigma corners, common timing arcs within different yield-critical paths are identified (STEP 406).

Next, a simulation is run to generate random delay samples for timing arcs (i.e., elements of the delay matrix representing the delay for timing arcs in one sample of the design) are assigned to yield-critical paths throughout the cell, based on speed index values generated by a Monte Carlo value generator, and in particular, ensuring that paths that have a common timing arc use the same speed index value generated by the Monte Carlo value generator. Accordingly, delay samples for each particular timing arc provide a delay distribution associated with that particular timing arc (STEP 408), each delay sample populates one element of one delay matrix. The set of delay samples for any particular timing arc forms the delay distribution for that timing arc. One such delay distribution exists for each timing arc over the set of IC samples (i.e., the plurality of delay matrices). In particular, a Monte Carlo value generation technique is used to generate delay matrices of values for each of the timing arcs of each yield-critical timing path. Those timing arcs that are common to two or more paths use the same generated speed index value to generate delays within the same delay matrix (i.e., simulated cell sample). The Monte Carlo generation technique uses probability distribution determined from the information provided by the variation-aware timing analysis and the limitations imposed by the 6-sigma pruning as the criteria for determining the speed index values to be used to generate each delay for a particular instance of the delay matrix (i.e., simulated instance of delays for the sample IC). That is, the Monte Carlo value generator will generate each speed index based on the results of the variation-aware timing analysis, the 6-sigma pruning of the distribution of values resulting from the variation-aware timing analysis. A delay sample value for each timing arc is selected based on the delay distribution determined by the variation-aware timing analysis, the path context (i.e., which path is at issue) and the speed index.

Next, arrival/slack for each endpoint for each IC sample can be computed (i.e., for each delay matrix) based on the subset of delays associated with each endpoint and the delay requirements for each endpoint. The design slack for each IC sample can be determined by identifying the endpoint with the worst slack. A delay distribution can be determined for each endpoint over the set of IC samples. In addition, the design slack distribution is the distribution of slack values over the set of IC samples. The computed arrival/slack and design slack distributions are used to determine the design yield and to update block and design level slack distributions (STEP 410). That is, by determining the endpoint with the worst slack for each IC sample and determining the number of IC samples for which the worst slack is non-negative divided by the total number of IC samples, the value of the timing yield is determined. That is, the timing yield is the ratio of all IC samples in which all endpoints have a slack that is non-negative with respect to the total of all IC samples.

Upon updating the block and design level slack distributions, a new set of random delay samples for cells can be generated and used to once again sample path delay distributions (STEP 408). At completion of the iterative process that is performed in STEP 408 and STEP 410, or at particular points throughout that iterative process, measurements can be made of the parametric timing yield based on the ratio of IC samples (i.e., delay matrices) in which all paths have non-negative slack to the total number of IC samples. That is, measurements can be made to determine the ratio of resulting products that will meet the timing requirements verses those that will not. In addition, timing yield bottlenecks, such as critical cells, paths and blocks that have very poor slack can be identified. These measurements and bottlenecks can be used to determine when to end the iterative process that occurs through the repetition of STEP 408 and STEP 410. The determination of bottlenecks can be made simply by identifying particular paths that more consistently have negative slack.

Figure 5:
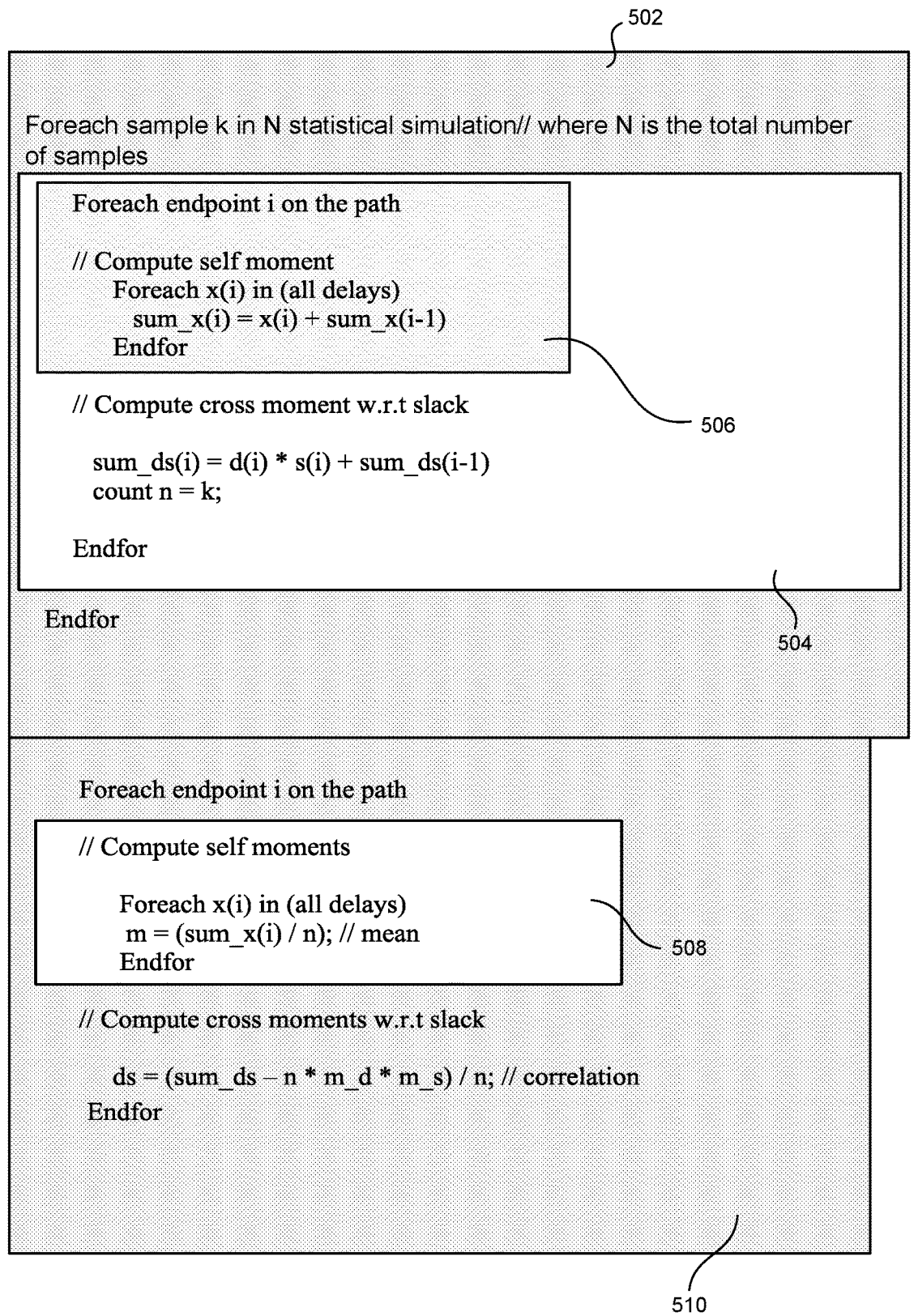
FIG. 5 is sample pseudo-code intended to provide one example of the way in which statistical moments can be incrementally computed during simulation to determine yield and bottlenecks.

FIG. 5 is sample pseudo-code intended to provide an example of the way in which cross moments can be incrementally computed during simulation to determine bottlenecks. In some embodiments, upon completion of the simulation, the yield bottleneck can be computed by computing cross-moments between the design slack distribution and the individual delay distribution for each timing arc.

Looking at the pseudo-code of FIG. 5, a first three "For loops" 502, 504, 506 are performed, in which the inner most loop 506 computes the self moment, the middle loop 504 computes the cross moment with respect to the slack and the outer loop 502 advances the process to perform that computation for each of the samples (i.e., for each instance of the delay matrix). Another two For loops 508, 510 are then performed. The inner loop 508 determines the mean of the self moment. The outer loop 510 computes the correlation in the cross moments, crossing the delay distribution of each timing arc with the slack distribution over the IC samples.

Besides providing accurate parametric timing yield, the disclosed method and apparatus also identify yield bottleneck at a different level of the design through the statistical regression method shown in FIG. 5. The method computes statistical moments incrementally during simulation in the inner loop 506. And when simulation is done, it will compute the yield bottleneck by computing cross-moments (correlation, coskewness, etc.) between design slack distribution and individual delay distribution in loop 510. Once cross-moments are computed in loop 510, they can be used in bottleneck analysis to identify the yield bottlenecks for potential yield ECO. That is, bottleneck cells are defined as the cells with larger correlation ("ds" in the pseudo code).

Hardware Implementation

Figure 6A:
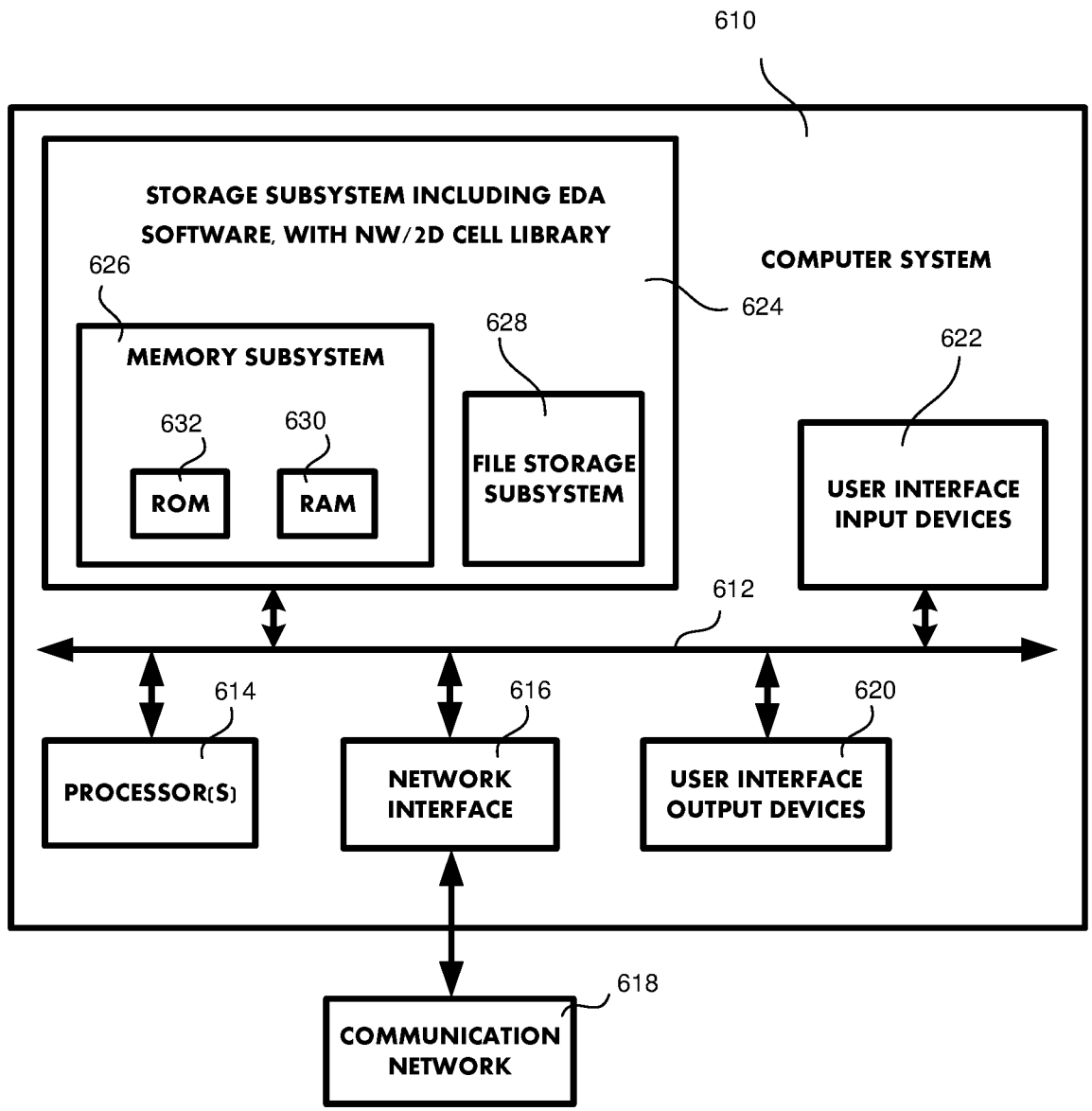
FIG. 6A is a simplified block diagram of a computer system suitable for use with embodiments of the technology.
Figures 6B, 6C:
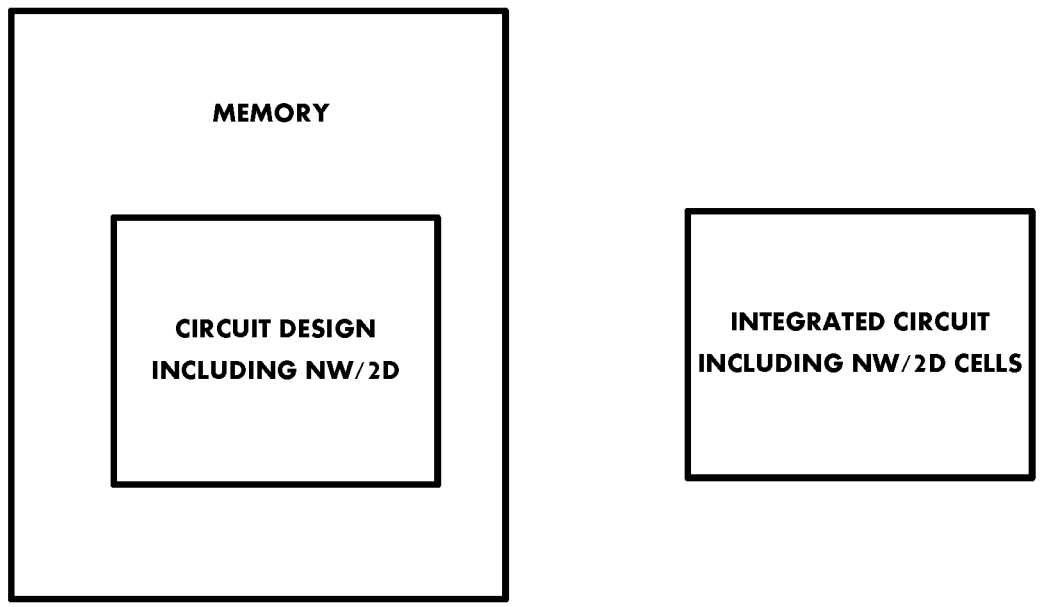
FIG. 6B illustrates a circuit design.
FIG. 6C illustrates an integrated circuit embodiment of the technology.

FIG. 6A is a simplified block diagrams of a computer system suitable for use with embodiments of the technology. FIG. 6B illustrates a circuit design and FIG. 6C illustrates an integrated circuit embodiment of the technology.

In some embodiments, the computer system 610 includes at least one processing device 614, such as a computer or processor. The processing device 614 communicates with a number of peripheral devices 616, 620, 622, 626, 628 via bus subsystem 612. In some such embodiments, the processing device 614 can be or include a processor, a microprocessor, graphics processing unit, digital signal processor, or their electronic processing equivalents, such as an Application Specific Integrated Circuit ('ASIC') or Field Programmable Gate Array ('FPGA'). The term 'processor' is used herein in the broadest sense to include a singular processor and multi-core or multi-processor arrays, including graphic processing units, digital signal processors, digital processors and combinations of these devices. Furthermore, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 610 depicted in FIG. 6A is intended only as one example for purposes of illustrating the preferred embodiments. Many other configurations of computer system 610 are possible having more or less components than the computer system depicted in FIG. 6A.

In some embodiments, the peripheral devices include one or more of: a storage subsystem 624 comprising a memory subsystem 626 and a file storage subsystem 628; user interface input devices 622; user interface output devices 620; and a network interface subsystem 616. The user interface input devices 622 and user interface output devices 620 allow users to interact with computer system 610.

The computer system 610 may be a server computer, a client computer, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine capable of executing instructions (sequential or otherwise) that specify actions to be taken by that machine.

In some embodiment, the computer system 610 includes an operating system, such as Microsoft's Windows, Sun Microsystems's Solaris, Apple Computer's MacOs, Linux or Unix. In some embodiments, the computer system 610 also can include a Basic Input/Output System (BIOS) and processor firmware. In some such embodiments, the operating system BIOS and/or firmware are maintained in the storage subsystem 624. In some such embodiments, the operating system, BIOS and firmware are used by the processor 614 to control subsystems and interfaces connected to the processor 614. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system.

Network interface subsystem 616 provides an interface to outside networks, such as an interface to communication network 618, and in some embodiments, is coupled via communication network 618 to corresponding interface devices in other computer systems or machines (not shown). In some embodiments, communication network 618 comprises many interconnected computer systems, machines and communication links not expressly shown. These communication links may be wireline links, optical links, wireless links, and/or may use any other types of devices for communication of information. Furthermore, the communication network 618 can be any suitable computer network, for example a wide area network such as the Internet, and/or a local area network, such as Ethernet. The communication network 618 can be wired and/or wireless, and in some embodiments, uses encryption and decryption methods, such as the method available with a virtual private network. In some embodiments, the communication network 618 uses one or more communications interfaces, which can receive data from, and transmit data to, other systems. Some embodiments of communications interfaces include an Ethernet card, a modem (e.g., telephone, satellite, cable, or ISDN), (asynchronous) digital subscriber line (DSL) unit, Firewire interface, USB interface, and the like. In some embodiments, one or more communications protocols can be used, such as HTTP, TCP/IP, RTP/RTSP, IPX and/or UDP.

User interface input devices 622 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term 'input device' is intended to include all possible types of devices and ways to input information into computer system 610 or onto communication network 618.

User interface input devices typically allow a user to select objects, icons, text and the like that appear on some types of user interface output devices, for example, a display subsystem.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term 'output device' is intended to include all possible types of devices and ways to output information from computer system 610 to the user or to another machine or computer system.

Memory subsystem 626 typically includes a number of memories including a main random-access memory ('RAM') 630 (or other volatile storage device) for storage of instructions and data during program execution and a read only memory ('ROM') 632 in which fixed instructions are stored. File storage subsystem 628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 628.

Bus subsystem 612 provides a device for letting the various components and subsystems of computer system 610 communicate with each other as intended. Although bus subsystem 612 is shown schematically as a single bus, alternative embodiments of the bus subsystem may use multiple busses. For example, RAM-based main memory can communicate directly with file storage systems using Direct Memory Access ('DMA') systems.

In some embodiments, software modules can be stored within the memory subsystem 626 that causes the computer system to perform the functions noted above with regard to the methods described in this disclosed. Such software modules improve the operation of the computer system by allowing the computer system to perform improved operations in the field of manufacturing integrated circuit chips. The functions performed by the computer system functioning in accordance with such software modules are a significant improvement in the field and represent a specific implementation of the method to solve a real and important problem in the determination of design yield and in determining where bottlenecks in the timing of an integrated circuit exist, thus allowing design improvements to be made on the fly to improve the integrated circuit design yield and reduce the cost of manufacturing by reducing waste and inefficiency in the production of such integrated circuits.

FIG. 6B depicts a memory 640 such as a non-transitory, computer readable data and information storage medium associated with file storage subsystem 628, and/or with network interface subsystem 616, and can include a data structure specifying a circuit design. The memory 640 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 6C illustrates an integrated circuit 690 created with the described technology that includes one or more cells selected, for example, from a cell library.

Some of the innovations, embodiments and/or examples described herein comprise and/or use a computer system, such as the computer system 610 described above. As used herein, the term 'computer system' signifies a tangible data and information processing device that physically transforms data and information, typically using sequence transformations (also referred to as 'operations'). Data and information can be physically represented by an electrical, magnetic, optical or acoustical signal that is capable of being stored, accessed, transferred, combined, compared, or otherwise manipulated by the processor. The term 'processor' can signify a singular processor and multi-core systems or multi-processor arrays, including graphic processing units, digital signal processors, digital processors or combinations of these elements.

The computer system can be electronic, for example, comprising digital logic circuitry (for example, binary logic), or analog (for example, an operational amplifier). The computer system can also be non-electronic, for example, as seen in computer systems based on optical signal processing, DNA transformations or quantum mechanics, or a combination of technologies, such as an optoelectronic computer system. For data and information structured in binary form, any computer system that can transform the data and information using the AND, OR and NOT logical operations (and their derivatives, such as the NAND, NOR, and XOR operations) can transform the data and information using any function of Boolean logic. A computer system such as an analog neural network computer system can also transform data and information non-digitally. No scientific evidence exists that any of these computer systems are processing, storing and retrieving data and information, in any manner or form equivalent to the bioelectric structure of the human brain.

The one or more computer systems may also operate to support performance of the relevant operations in a 'cloud computing' environment or as a 'software as a service' (SaaS). For example, at least some of the operations may be performed by a group of computer systems available at a distributed or remote system, these computer systems accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence of transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a computer system comprising one or more modules can have the modules configured at different times. The computer system can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The 'substance' of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a computer system for use in the innovations, embodiments and examples described in this specification. Such devices configurable by software include one or more computers, for example, standalone, client or server computers, or one or more hardware modules, or systems of one or more such computers or modules. As used herein, the term 'software application' signifies a set of data and instructions that configure the computer system to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the C programming language or similar programming languages (such as SystemC), or object oriented programming language such as Smalltalk, C++ or the like, and any future equivalent programming languages.

Software is entered into, equivalently, read into, one or more memories of the computer or computer system from a data and information storage device. The computer typically has a device for reading storage media that is used to transport the software or has an interface device that receives the software over a network. This process is discussed in the General Computer Explanation section.

The invention recited in the claims appended hereto may be implemented by the computer system 610 to perform functions of a design and manufacture process (DMP) to create an item of manufacture. The DMP may include an Electronic Design Automation (EDA) process. In such a DMP, information for a product idea is supplied by a designer. The information is transformed by the DMP to create the item of manufacture.

In some embodiments, the DMP 700 uses an EDA software tool 712 (which in some embodiments is EDA software) as a design tool, or a verification tool. When the design is finalized, it can be taped-out 734, which typically is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed, which result in the finished integrated circuit 740 which may also be signified herein as a circuit, device, component, chip or SoC (System on Chip).

Items of manufacture, such as circuits or systems produced by the DMP are used in commerce at a variety of levels of abstraction ranging from low-level transistor layouts to high-level description languages. Most designers start at high-level of abstraction to design their circuits and systems, using a hardware description language ('HDL') such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level ('RTL') description, a gate-level description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, which is much used for detailed descriptions of analog-based circuits.

Figure 7:
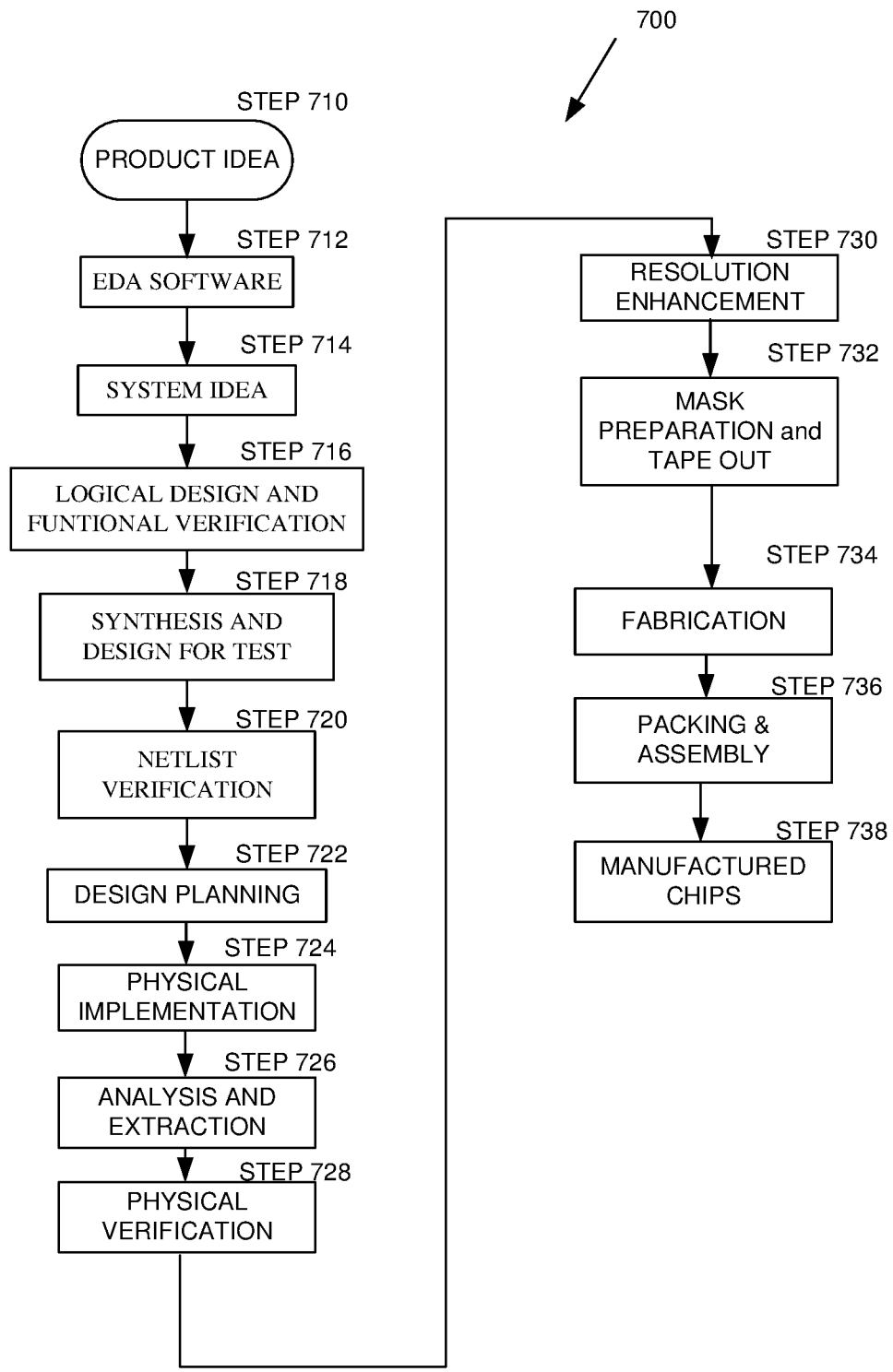
FIG. 7 illustrates one example of a design and manufacture process performed in the design, verification and fabrication of an item of manufacture.

FIG. 7 illustrates one example of a DMP 700 performed in the design, verification and fabrication of an item of manufacture, such as an integrated circuit, using software tools with a computer system, such as the computer system 610, and possibly special hardware-assisted tools not expressly shown herein, to transform and verify design data and instructions that represent the design of the integrated circuit. The DMP disclosed with respect to FIG. 7 is for illustration purposes only and is not meant to limit the present disclosure. For example, in some embodiments of the disclosed method and apparatus, the DMP may require a designer to perform the design operations in a different sequence than the sequence described herein.

The example DMP 700 starts with the creation of a product idea (STEP 710). In some embodiments, the DMP 700 implements an EDA software tool 712. During system design 714, a designer uses the EDA tool to assist in describing the functionality to be manufactured. The designer can also perform what-if planning to refine the functionality and to check costs, etc. Hardware-software architecture partitioning can occur at this stage. Examples of EDA software products from Synopsys, Inc. of Mountain View, California that can be used at this stage include: Model Architect, Saber, System Studio, and Designware products.

Next, a logic design and functional verification is performed (STEP 716). During logic design and functional verification, modules in the circuit are specified in one or more hardware description languages, or HDLs. In addition, the design is checked for functional accuracy. That is, the design is checked to match the requirements of the specification of the circuit or system being designed to ensure that the design produces the correct outputs. Examples of HDL languages include: Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Examples of EDA software products that can be used at this stage include: VCS, Vera, Designware, Magellan, Formality, ESP and Leda products, each from Synopsys, Inc. of Mountain View, California. Examples of emulator and prototyping products also available from Synopsys that can be used at this stage include: Zebu® and Protolink® (RTM signifies 'Registered Trademark').

The next step requires synthesis and design for test (STEP 718). During synthesis and design for test, HDL code is translated to a netlist. The netlist can be optimized for the target technology. Additionally, tests can be designed and implemented to check the finished integrated circuit. Examples of EDA software products that can be used at this stage include: Design Compiler, Physical Compiler, Test Compiler, Power Compiler, FPGA Compiler, Tetramax, and Designware products, each from Synopsys, Inc. of Mountain View, California.

Following the synthesis and design for test, the netlist is verified (STEP 720). During netlist verification, the netlist is checked for compliance with timing constraints and for correspondence with the HDL code. Examples of EDA software products that can be used at this stage include: Formality, Primetime, and VCS products, each from Synopsys, Inc. of Mountain View, California.

Next, design planning is performed (STEP 722). During design planning, an overall floor plan for the integrated circuit is constructed and analyzed for timing and top-level routing. Examples of EDA software products that can be used at this stage include: Astro and IC Compiler products, each from Synopsys, Inc. of Mountain View, California.

Following design planning, a layout is implemented (STEP 724). During layout implementation, the physical placement (positioning of circuit elements such as transistors or capacitors) and routing (connection of the same by a plurality of conductors) occurs, as can selection of library cells to perform specific logic functions. Examples of EDA software products that can be used at this stage include: the Astro and IC Compiler products, each from Synopsys, Inc. of Mountain View, California.

Once the layout implementation is complete, an analysis and extraction is performed (STEP 726). During analysis and extraction, the circuit function is verified at the layout level, which permits refinement of the layout design. Examples of EDA software products that can be used at this stage include: Astrorail, Primerail, Primetime, and Star RC/XT products, each from Synopsys, Inc. of Mountain View, California.

Next, the physical layout is verified (STEP 728). During physical verification, the layout design is checked to ensure correctness for manufacturing constraints such as design rule constraints, electrical constraints, lithographic constraints, and circuitry function matching the HDL design specification. An example of an EDA software product that can be used at this stage includes the Hercules product from Synopsys, Inc. of Mountain View, California.

Next, enhancements to the resolution of the layout are done (STEP 730). During resolution enhancement, geometric manipulations of the layout are performed to improve manufacturability of the design. An example of an EDA software product that can be used at this stage is the Proteus product from Synopsys, Inc. of Mountain View, California.

During one or more of design planning, physical implementation, analysis and extraction, physical verification, and resolution enhancement, the method and apparatus for determining and optimizing design yield, such as disclosed above in FIG. 4, may be performed as a part of one or more of these steps.

Next, the masks are prepared and the design is "taped out" (STEP 732). Data is created to be used (after lithographic enhancements are applied, if appropriate) for production of lithography masks. Tape-out data is used to produce the lithography masks that are used to produce finished integrated circuits. Examples of EDA software products that can be used at this stage include the CATS family of products from Synopsys, Inc. of Mountain View, California. In addition, Examples of EDA software products that can be used during tape-out include the IC Compiler and Custom Designer families of products from Synopsys, Inc. of Mountain View, California.

The integrated circuit design tools noted above are merely examples of tools that can be used. Similar commercial tools and various non-commercial tools from other EDA vendors (such as Cadence, Siemens), other corporate entities, universities, or open source repositories, can be used as an alternative.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

Figure 8:
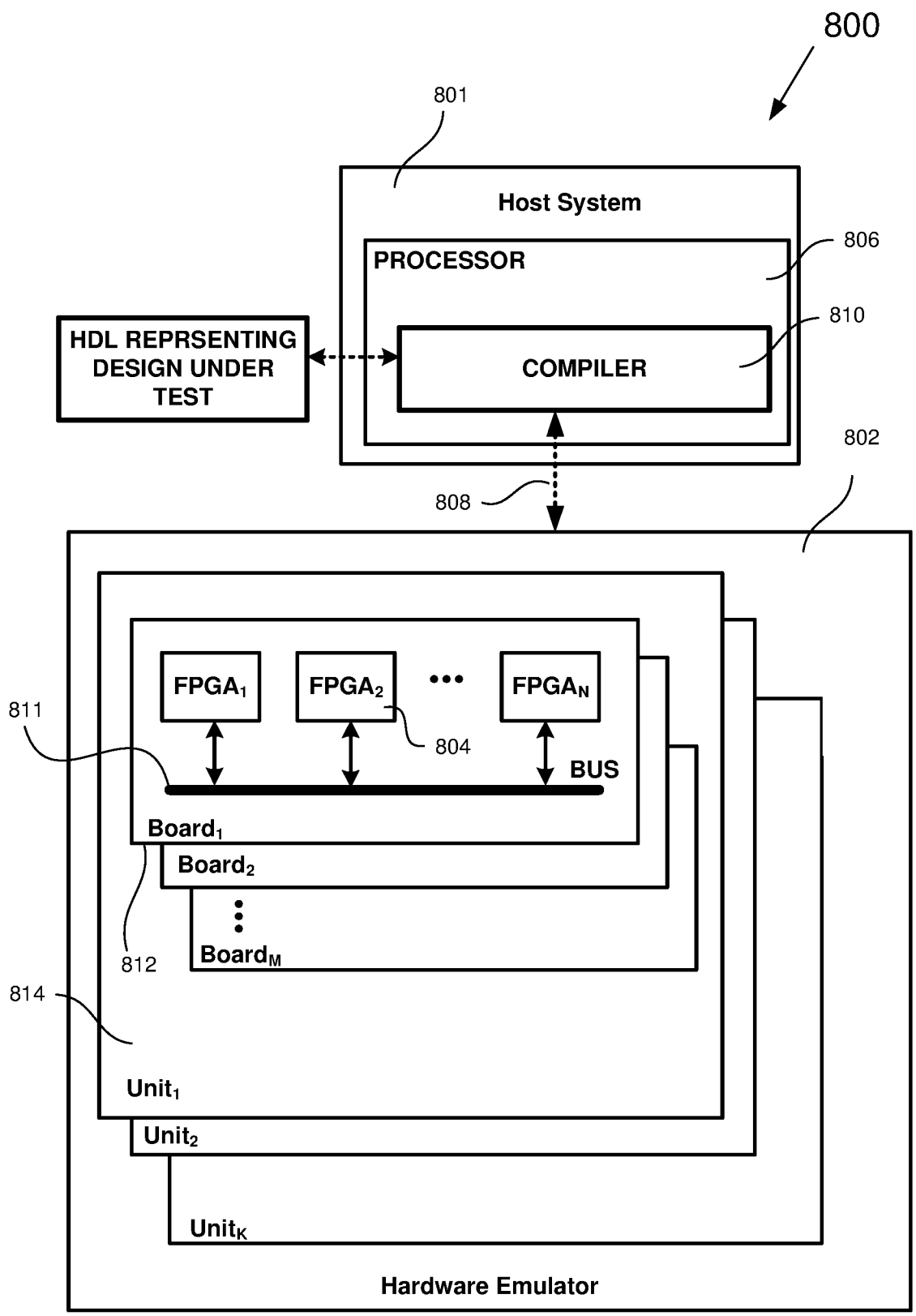
FIG. 8 illustrates additional details with regard to an implementation of one example of a test platform that includes a host system and an emulator.

In accordance with some embodiments of the disclosed method and apparatus, an EDA process, such as the EDA process disclosed with respect to the DMP 700 of FIG. 7, typically includes an emulator to verify the functionality of a circuit design. For example, in the DMP 700 noted above with respect to FIG. 7, examples of an emulator and prototyping product available from Synopsys that can be used to assist in logical design functional verification (STEP 712) include: Zebu® and Protolink® (® signifies 'Registered Trademark'). FIG. 8 illustrates additional details with regard to an implementation of one example of a test platform 800 that includes a host system 801 and an emulator 802. In some embodiments, the emulator 802 is a set of programmable devices, such as FPGAs 804. In some such embodiments, the host system 801 generates data and information using a compiler 810 to configure the emulator 802 to emulate a circuit design. One of more circuit designs to be emulated are referred to as a Design Under Test ('DUT'). The emulator 802 is a hardware system that emulates a DUT. That is, the emulator 802 is used the emulation the performance of the DUT to verify the functionality of the DUT. One example of a product that can be used as the emulator 802 for the embodiments disclosed herein is the ZeBu Server available from Synopsys, Inc.

The host system 801 comprises one or more processors 806. In the embodiment where the host system 801 is comprised of multiple processors 806, the functions described herein as being performed by the host system 801 may be distributed among the multiple processors 806.

In some embodiments, at least one of the processor 806 within the host system 801 includes a compiler 810 that processes code written in a hardware description language that represents the DUT being emulated by the emulator 802. The compiler produces data (typically binary) and information that is used to configure the emulator 802 to emulate the DUT. The compiler 810 may transform, change, reconfigure, add new functions to, and/or control the timing of the DUT.

The host system 801 and emulator 802 exchange data and information using signals carried by an emulation connection 808. The connection 808 can be one or more electrical cables, for example, cables with pin configurations compatible with the RS232 or USB protocols. The connection 808 can be a wired communication medium or network, such as a local area network, or a wide area network such as the Internet. The connection can be a wireless communication medium or a network with one or more points of access, using a wireless protocol, such as Bluetooth® or IEEE 802.11. The host system 801 and emulator 802 can exchange data and information through a third device, such as a network server (not shown).

In some embodiments, the emulator 802 includes a plurality of FPGAs 804. In some such embodiments, each FPGA 804 interfaces through a bus 811 to other FPGAs 804 of the emulator 802 (and potentially other emulator hardware components) in order for the FPGAs 804 to exchange signals. While some embodiments disclosed herein use emulators comprising FPGAs, other embodiments can include other types of logic blocks instead of, or along with, the FPGAs 804 for emulating DUTs. For example, some embodiments may use custom FPGAs, specialized ASICs for emulation or prototyping, memories, and input/output devices.

The FPGAs 804 may reside on one or more hardware boards 812. Several boards 812 may be placed into a hardware unit 814. The boards 812 within each unit 814 may be connected to one another by cables or any other means to form a multi-unit emulator 802. In some embodiments, the emulator 802 comprises a single board 812, a single unit 814 with one or more boards 812, or with multiple units 814, each with one or more boards 812, each board 812 with one or more units without departing from the teachings of the present disclosure.

For a DUT that is to be emulated, the emulator 802 receives from the host system 801 one or more "bit files".

The bit files include a description of the DUT. The bit files further specify partitions of the DUT created by the host system 801, with: (1) trace and injection logic, (2) mappings of the partitions to the FPGAs of the emulator 802, and (3) design constraints. Based on the bit files, the emulator 802 configures the FPGAs 804 to perform the functions of the emulated DUT. With some emulators 802, one or more FPGAs 804 of the emulator 802 already have trace and injection logic built into the silicon of the FPGA 804. For this type of emulator 802, the FPGAs 804 do not have to be configured by the host system 801 to emulate trace and injection logic.

The host system 801 receives (e.g., from a user or from a data store) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system 801 synthesizes the DUT description to create a gate level netlist based on the DUT description. A host system 801 can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system 801 maps each partition to an FPGA of the emulator 802. With some emulators, the trace and injection logic is only included in select partitions for a group of FPGAs. The trace and injection logic can be built into one or more of the FPGAs of an emulator 802. The host system 801 can synthesize multiplexers to be mapped into the FPGAs. The multiplexers can be used by the trace and injection logic to inject interface signals into the DUT logic.

The host system 801 creates bit files describing each partition of the DUT and the mapping of the partitions to the FPGAs. For partitions in which trace and injection logic was incorporated, the bit files also describe the incorporation of the logic. The bit files may also include place and route information and design constraints. The host system 801 stores the bit files and also stores for components of the DUT information describing which FPGAs are to emulate each component of the DUT (to which FPGAs each component is mapped).

Upon request, the host system 801 transmits the bit files to the emulator 802. The host system 801 instructs the emulator 802 to emulate the DUT. During emulation of the DUT or at the end of the emulation, the host system 801 receives emulation results from the emulator 802 through the emulation connection 808. Emulation results are data and information generated by the emulator 802 based on the emulation of the DUT. The emulation results include interface signals (states of interface signals) traced by the trace and injection logic of each FPGA. The host system 801 can stores the emulation results, or transmit them to another processing system.

After emulation of the DUT, a user may request to debug a component of the DUT. If such a request is made the user may provide a time period of the emulation to debug. The host system 801 identifies which FPGAs are configured to emulate the component based on the stored information. The host system 801 retrieves stored interface signals associated with the time period and traced by the trace and injection logic of each identified FPGA. The host system 801 instructs the emulator 802 to re-emulate the identified FPGAs, either one by one, multiple at a time, or altogether. The host system 801 transmits the retrieved interface signals to the emulator 802 in order to re-emulate the component for the time period. The trace and injection logic of each identified FPGA injects its respective interface signals received from the host system 801 into the logic of the DUT mapped to the FPGA. In case of multiple re-emulations of an FPGA, the results may be merged all together to have a full debug view.

The host system 801 receives from the emulator signals traced by logic of the identified FPGAs during the re-emulation of the component. The host system 801 stores the signals received from the emulator 802. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system 801 can retrieve the stored signal and display a plot of the signal (generates a waveform of the signal). Afterwards the user can, for example, request to re-emulate the same component but for a different time period or to re-emulate another component.

A host system 801 typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator 802, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator 802. The mapping module performs the partitioning and mapping using design rules, design constraints (e.g., timing or logic constraints), and information about the emulator 802. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator 802. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator 802, which the emulator 802 uses to configure the FPGAs to emulate the DUT.

If the emulator 802 includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator 802. The run time module may cause the emulator 802 to start or stop executing an emulation. Additionally, the run time module may provide input signals/data to the emulator 802. The input signals may be provided directly to the emulator 802 through the connection or indirectly through other input signal devices. For example, the host system 801 with the run time module may control an input signal device to provide the input signals to the emulator 802. The input signal device may be, for example, a test board (directly or through cables), signal generator, another emulator (not shown), or another host system (not shown).

The results module processes emulation results generated by the emulator 802. During emulation and/or after completing the emulation, the results module receives emulation results from the emulator 802 generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator 802 has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator 802 that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator 802. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator 802 so that the tracing logic traces hardware states at the proper intervals. To debug the component, the emulator 802 only has to run the FPGAs to which the component has been mapped. Additionally, the re-emulation of the component does not have to start from the beginning but can start at any point desired by the user.

For an identified FPGA, the debug module can transmit instructions to the emulator 802 to load multiple emulator FPGAs with the same configuration of the identified FPGA. The debug module additionally instructs the emulator 802 to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator 802 for re-emulation. Hence, a user can identify any element (e.g., component or signal) of the DUT to debug/re-emulate.

The waveform module generates waveforms based on traced signals. If a user requests to view a waveform of a signal traced during an emulation run, the host system 801 retrieves the signal from the storage module. The waveform module displays a plot of the signal to the user. For one or more signals, when the signals are received from the emulator 802, the waveform module can automatically generate the plots of the signals.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for computing timing yield for an integrated circuit (IC) having a plurality of timing arcs and endpoints, a plurality of subsets of the timing arcs, each subset associated with an endpoint, the method comprising:
    a) generating a speed index associated with each timing arc of a first IC sample to determine a random delay value, wherein the same speed index is used for common timing arcs to determine the random delay values for different signal paths through the common timing arcs of an element of the integrated circuit;
    b) generating a first delay sample for each timing arc of the first IC sample based on the associated speed index, a delay distribution of the timing arc and a path context;
    c) determining a slack for each endpoint of the first IC sample;
    d) determining the worst slack from among the slacks determined for the first IC sample;
    e) repeating a) through d) for a plurality of IC samples; and
    f) determining timing yield for the IC based on the ratio of the number of determined worst slacks that have a non-negative value with respect to the total number of IC samples.

2. The method of claim 1, wherein the delay distribution for each timing arc is determined based on a variation aware timing analysis.

3. The method of claim 1, wherein the subset of timing arcs comprises a signal path through a simulated cell.

4. The method of claim 3, wherein the common timing arcs comprise a timing arc on a first signal path and a second signal path, wherein the delay of the timing arc on the first signal path is different from the delay of the timing arc on the second signal path.

5. The method of claim 4, further comprising generating a delay matrix having elements that include the delay samples for all timing arcs, each delay matrix representing a simulated sample cell.

6. The method of claim 1, wherein the speed indexes are generated by a Monte Carlo value generator.

7. The method of claim 1, wherein determining the slack for each subset of timing arcs includes summing the delay samples for each timing arc of the subset.

8. A computer system comprising:
    a) a storage subsystem including an Electronic Design Automation (EDA) module;
    b) a processor coupled to the storage subsystem for receiving from the storage subsystem instructions to direct the processor to:
        i. generate a speed index associated with timing arc of a first IC sample to determine a random delay value, wherein the same speed index is used for common timing arcs to determine different random delay values for different signal paths through the common timing arcs of an element of the integrated circuit;
        ii. generate a first delay sample for each timing arc of the first IC sample based on the associated speed index, a delay distribution of the timing arc and a path context;
        iii. determine a slack for each endpoint of the first IC sample;
        iv. determine the worst slack from among the slacks determined for the first IC sample;
        v. repeat i. through iv. for a plurality of IC samples; and
        vi. determine timing yield for the IC based on the ratio of the number of determined worst slacks that have a non-negative value with respect to the total number of IC samples.

9. The computer system of claim 8, wherein the instructions received from the storage subsystem direct the processor to identify those paths of a particular cell that have a negative slack in the largest number of samples of the particular cell and adjust the design of the particular cell to reduce the likelihood of a negative slack in the identified paths.

10. The computer system of claim 8, wherein the instructions received from the storage subsystem direct the processor to:
    a) generating a delay matrix for the plurality of IC samples;
    b) determining the design slack for each of the plurality of IC samples and a design slack distribution for the plurality of IC samples;
    c) determining a delay distribution for a first timing arc over the plurality of IC samples;
    d) computing a value of a cross moment of:
        i. the design slack distribution; with
        ii. the delay distribution of delays for the first timing arc; and
    e) repeating c) and d) for each timing arc of the IC; and f) determining in which cells the timing arc results in the cross moment having a value above a predetermined threshold and determining those cells to be timing bottlenecks.

* * * * *